United States Patent
Horrell, III

(10) Patent No.: US 11,002,034 B2
(45) Date of Patent: May 11, 2021

(54) UTILITY POLE CROSSARM CONVERSION APPARATUSES

(71) Applicant: Fred Joseph Horrell, III, Marion, IL (US)

(72) Inventor: Fred Joseph Horrell, III, Marion, IL (US)

(*) Notice: Subject to any disclaimer, the term of this patent is extended or adjusted under 35 U.S.C. 154(b) by 0 days.

(21) Appl. No.: 16/727,301

(22) Filed: Dec. 26, 2019

(65) Prior Publication Data

US 2020/0378146 A1    Dec. 3, 2020

Related U.S. Application Data

(60) Provisional application No. 62/855,742, filed on May 31, 2019.

(51) Int. Cl.
*E04H 12/08* (2006.01)
*E04H 12/24* (2006.01)
(Continued)

(52) U.S. Cl.
CPC ............. *E04H 12/08* (2013.01); *E04H 12/24* (2013.01); *B29L 2031/766* (2013.01);
(Continued)

(58) Field of Classification Search
CPC ... B29L 2031/1766; E04C 3/32; E04H 12/08; E04H 12/2261; E04H 12/2292; E04H 12/24; H02G 7/20
(Continued)

(56) References Cited

U.S. PATENT DOCUMENTS 2,535,270 A * 12/1950 Davis ............... H02G 7/20
174/158 R
2,613,913 A * 10/1952 Hubbard ............... H02G 7/20
254/231
(Continued)

FOREIGN PATENT DOCUMENTS

WO    WO2005032765 A1    4/2005

OTHER PUBLICATIONS

"Car Seat Cushion—Premium Firm Therapeutic Grade Automobile Wedge Pad to Elevate Height and Comfort While Driving", https://www.amazon.com/Car-Seat-Cushion-Therapeutic-Automobile/dp/B018215W86.
(Continued)

*Primary Examiner* — Patrick J Maestri
*Assistant Examiner* — Joseph J. Sadlon

(57) ABSTRACT

A utility pole crossarm conversion apparatus is disclosed. The apparatus includes first and second portions. The second portion is oriented opposite the first side. An indentation is positioned on the first side. A second portion is affixed to the second side. The first portion includes a chamfered edge. The indentation is bilaterally concaved and includes an apex angled at 45°-90°. The indentation is configured to receive a tip of a fastener of a utility pole cross arm clamp coupled to a composite utility pole extension arm. The indentation is medially positioned on the first side. The indentation initiates centrally on the first side and extends transversely across the first side to the chamfered edge. The first portion includes a metal. The second portion includes an elastic polymer. The apparatus includes an overall quadrilateral structure. The apparatus is configured to be frictionally coupled to a composite crossarm via the second portion.

19 Claims, 10 Drawing Sheets

(51) Int. Cl.
*B29L 31/00* (2006.01)
*E04H 12/22* (2006.01)
*E04C 3/32* (2006.01)
*H02G 7/20* (2006.01)

(52) U.S. Cl.
CPC ............ *E04C 3/32* (2013.01); *E04H 12/2261* (2013.01); *E04H 12/2292* (2013.01); *H02G 7/20* (2013.01)

(58) Field of Classification Search
USPC ...................................................... 52/651.02
See application file for complete search history.

(56) References Cited

U.S. PATENT DOCUMENTS

| | | | | |
|---|---|---|---|---|
| 2,886,269 | A * | 5/1959 | Carlson | H02G 7/20 248/70 |
| 3,217,086 | A * | 11/1965 | Taylor | H02G 7/20 174/40 R |
| 3,318,629 | A | 5/1967 | Brandt | |
| 4,934,675 | A * | 6/1990 | Klocke | B25B 1/205 269/111 |
| 6,409,135 | B1 | 6/2002 | Roberts | |
| 6,854,397 | B2 * | 2/2005 | Terajima | B65G 21/06 104/95 |
| 7,013,612 | B2 * | 3/2006 | Haddock | E04D 13/103 52/545 |
| 7,732,708 | B1 * | 6/2010 | Peabody | B65G 21/06 104/95 |

OTHER PUBLICATIONS

"Universal Extension Arm Retrofit Kit", https://www.hubbell.com/hubbellpowersystems/en/Products/Power-Utilities/Tools-Dies-Accessories/Conductor-Support/Arm/Universal-Extension-Arm-Retrofit-Kit/p/2793066.

"Vise-Grip Replacement Plier Pads", https://www.mscdirect.com/product/details/03700432.

* cited by examiner

UTILITY POLE CROSSARM CONVERSION APPARATUSES

CROSS-REFERENCE TO RELATED APPLICATIONS

This application claims priority to U.S. Provisional Application No. 62/855,742 filed May 31, 2019, which is hereby incorporated herein by reference.

FIELD OF THE INVENTION

The present disclosure relates generally to utility poles. More specifically, the present disclosure describes utility pole crossarm conversion apparatuses.

BACKGROUND OF THE INVENTION

In utility work, there is no greater demand than crossarm equipment that is reliable and resilient through all weather conditions and efficient for teams performing repairs, replacements or installations. A crossarm is an engineered piece of wood or composite equipment mounted on a utility pole to support power lines or other electrical equipment. A reliable crossarm is an important component for both tangent and dead-end applications and are used for anchoring and supporting conductors along transmission and distribution lines. From telephone companies, cable companies, railroads and refineries to municipal, rural and electrical utilities companies, crossarms are a vital part of each infrastructure. As the demand for wider electrical coverage continues to rise, so does the demand for more efficient installation and stronger, more reliable equipment.

Every day, these companies depend on the important function of crossarm products. But the importance of solid crossarm products isn't limited to just utilities. It's important to the customers of those companies who can't afford for their power to be down long. To address reliability concerns, composite crossarms are typically used. For example, live-line working is the maintenance of electrical equipment, often operating at high voltage, while the equipment is energized. Electricity utilities wish to avoid loss of supply, for which they receive customer complaints or are financially penalized. Utility pole maintenance typically requires the use of extension arms, which are brackets attached to utility poles to provide support for cables or wires at a distance from the pole and crossarm.

Extension arms are typically attached to crossarms via loops and/or fasteners. Although wooden crossarms are not usually damaged when the fasteners are used to affix extension arms thereto, such fasteners can damage extension arms that are made of composite materials. For example, fasteners can scratch, chip, puncture and/or cracks in the extension arm's composite material, which can degrade the structural integrity of the extension arm. Even more, environmental degradation affects all materials. Extended exposure to sun can cause composite crossarms to fray and splinter. Composite crossarm manufacturers have developed a UV protective coating that if scratched or chipped, may compromise its ability to protect the crossarm. The present disclosure seeks to provide apparatuses to reduce fasteners ability to damage composite crossarms when affixing extension arms to composite crossarms.

BRIEF DESCRIPTION OF THE DRAWINGS

Some of the embodiments will be described in detail, with reference to the following figures, wherein like designations denote like members, wherein.

Figure 1:
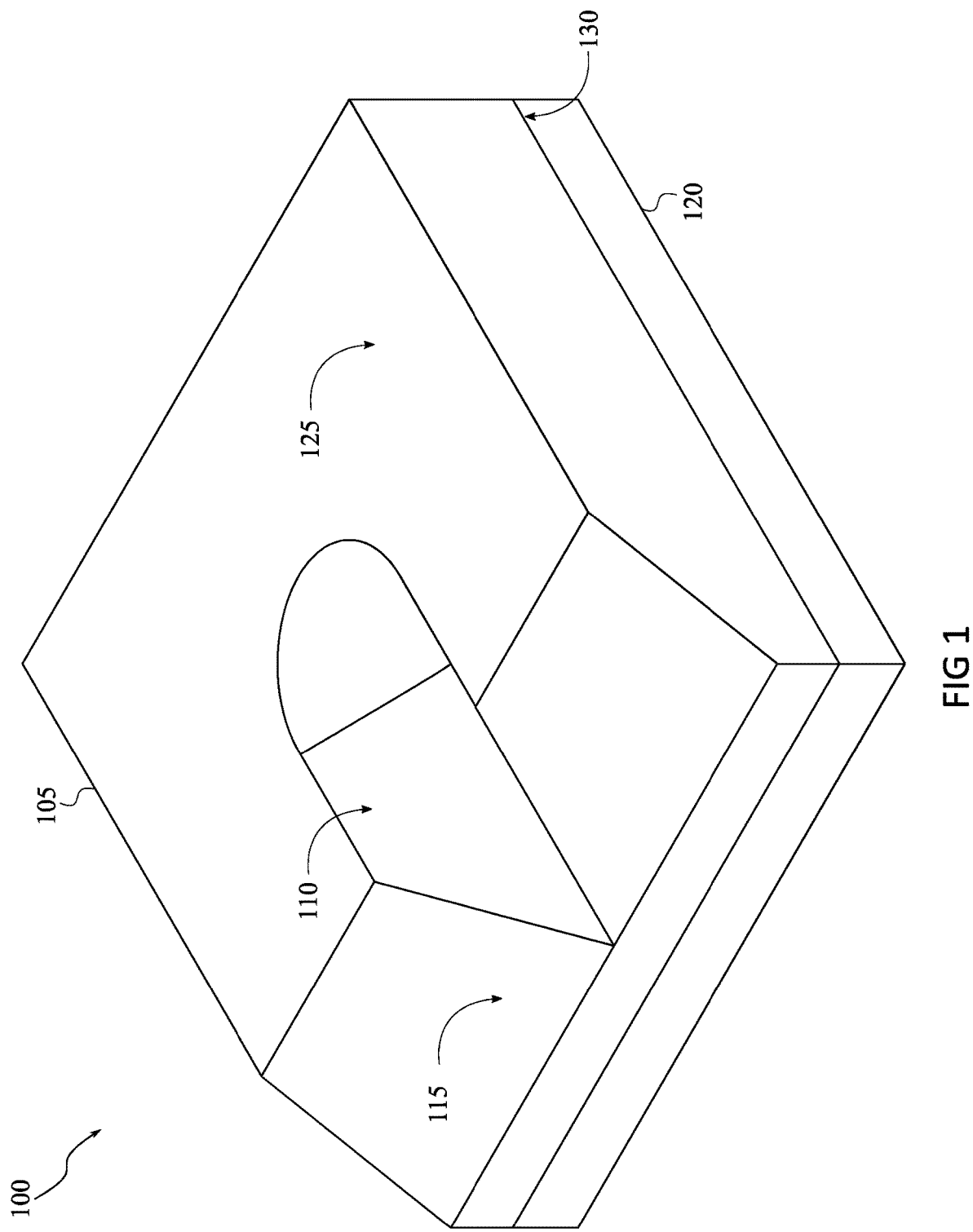
FIG. 1 depicts a top right perspective view according to some embodiments.
Figure 2:
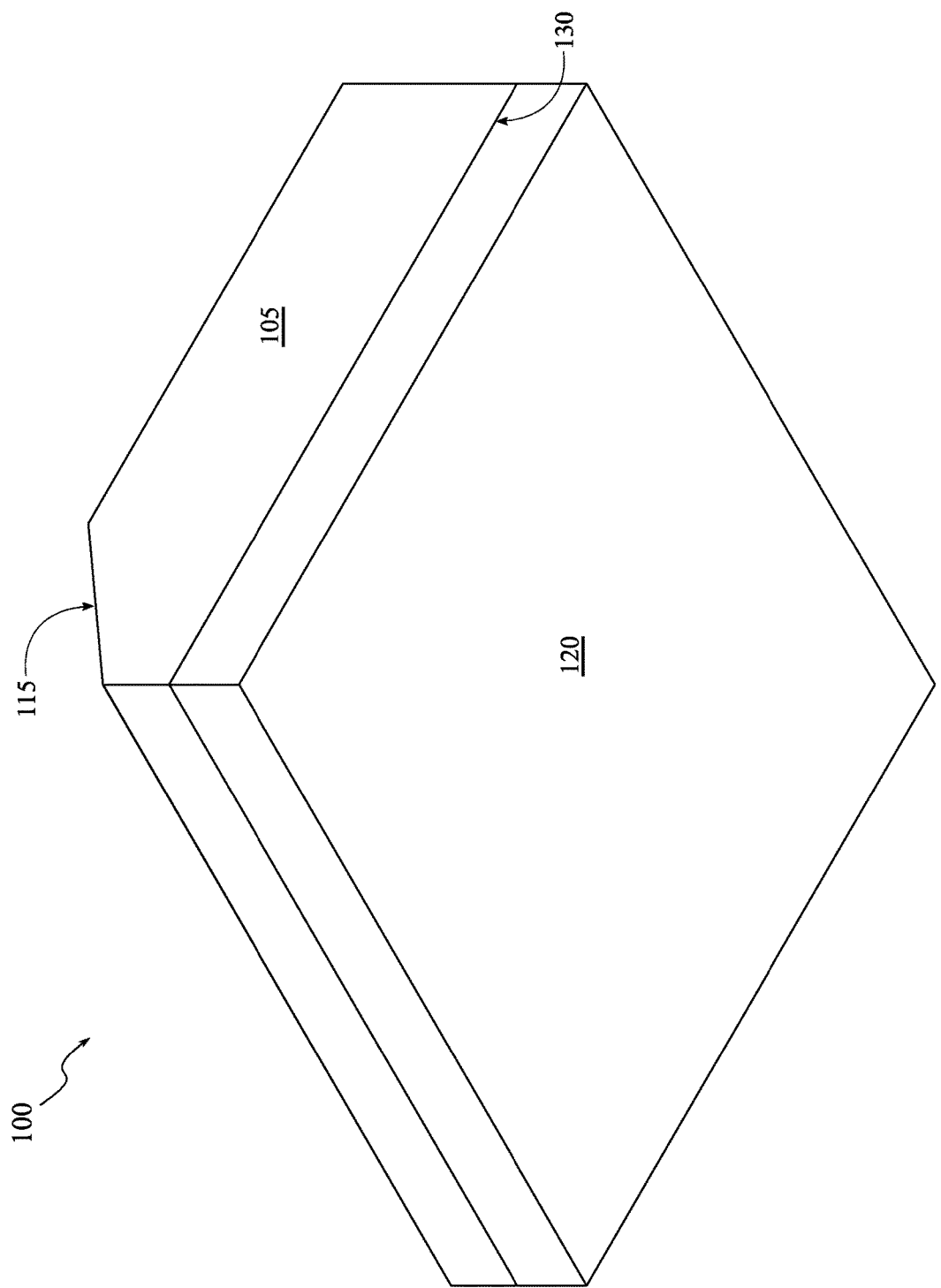
FIG. 2 depicts a bottom right perspective view according to certain embodiments.
Figure 3:
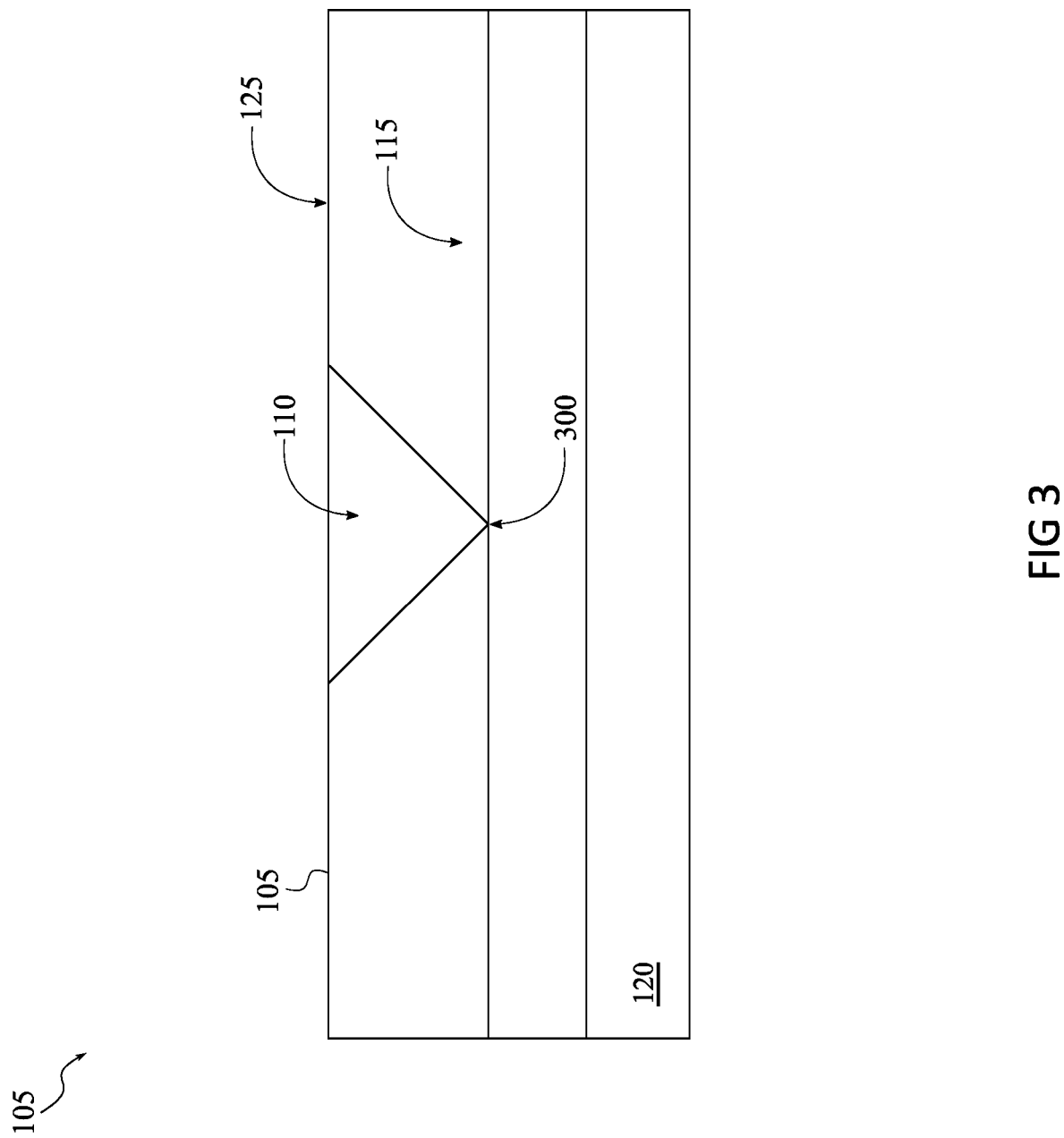
FIG. 3 depicts a front view of the present invention according to other embodiments.
Figure 4:
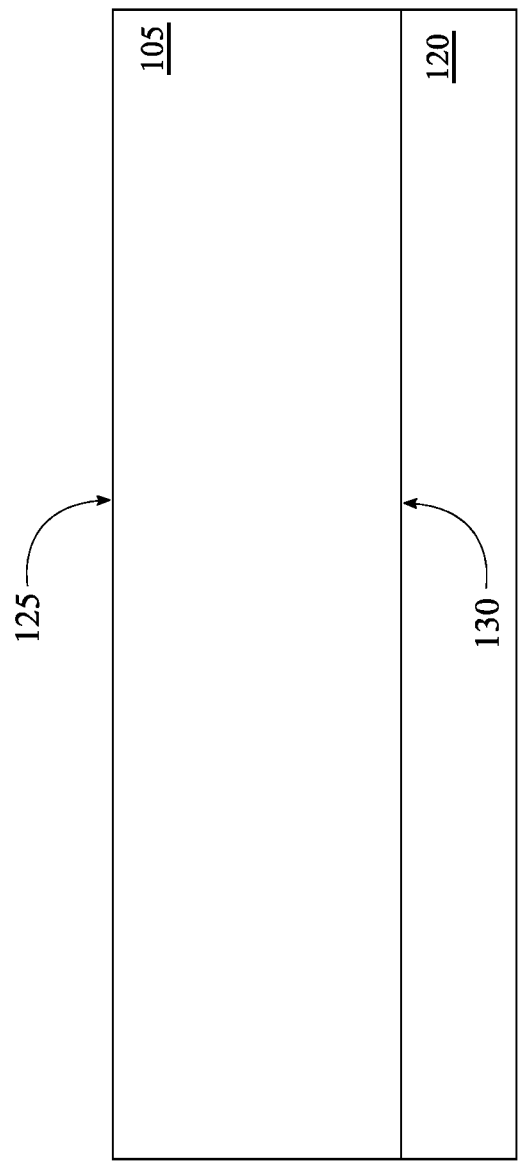
FIG. 4 depicts a rear view of the present invention according to yet still other embodiments.
Figure 5:
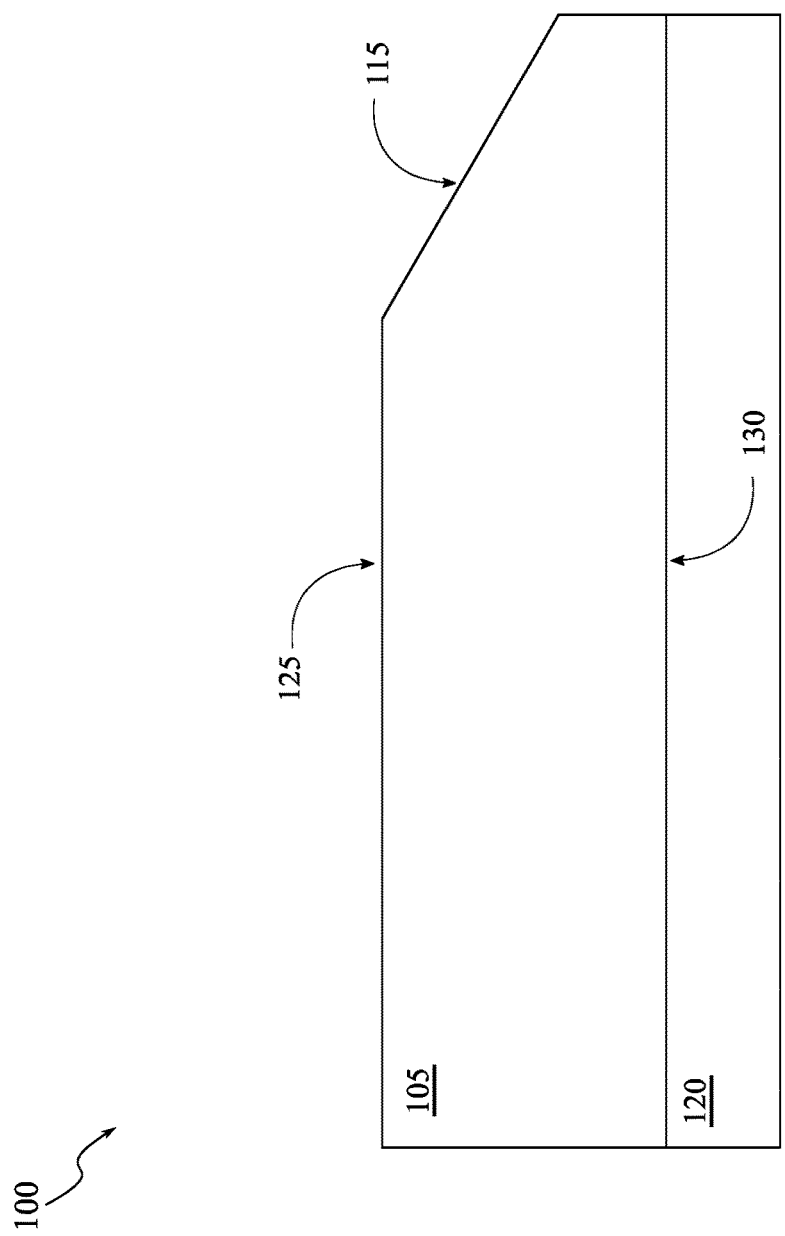
FIG. 5 depicts a left side view of the present invention according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of detection of presence of one or more intruder devices, embodiments of the present disclosure are not limited to use only in this context.

In utility work, there is no greater demand than crossarm equipment that is reliable and resilient through all weather conditions and efficient for teams performing repairs, replacements or installations. A crossarm is an engineered piece of wood or composite equipment mounted on a utility pole to support power lines or other electrical equipment. A reliable crossarm is an important component for both tangent and dead-end applications and are used for anchoring and supporting conductors along transmission and distribution lines. From telephone companies, cable companies, railroads and refineries to municipal, rural and electrical utilities companies, crossarms are a vital part of each infrastructure. As the demand for wider electrical coverage continues to rise, so does the demand for more efficient installation and stronger, more reliable equipment.

Every day, these companies depend on the important function of crossarm products. But the importance of solid crossarm products isn't limited to just utilities. It's important to the customers of those companies who can't afford for their power to be down long. To address reliability concerns, composite crossarms are typically used. For example, live-line working is the maintenance of electrical equipment, often operating at high voltage, while the equipment is energized. Electricity utilities wish to avoid loss of supply, for which they receive customer complaints or are financially penalized. Utility pole maintenance typically requires the use of extension arms, which are brackets attached to utility poles to provide support for cables or wires at a distance from the pole and crossarm.

Extension arms are typically attached to crossarms via loops and/or fasteners. Although wooden crossarms are not usually damaged when the fasteners affix extension arms thereto, such fasteners can damage crossarms that are made of composite materials (hereinafter "composite crossarms"). Composite crossarms can, for example, be made of fiberglass. For example, such fasteners can scratch, chip, puncture and/or crack composite material, which can degrade the structural integrity of the crossarm. Even more, environmental degradation affects all materials. Extended exposure to sun can cause composite crossarms to fray and splinter. Composite crossarm manufacturers have developed a UV protective coating that if scratched or chipped, may compromise its ability to protect the crossarm. The present disclosure seeks to provide apparatuses to reduce fasteners ability to damage composite crossarms when affixing extension arms to composite crossarms.

The instant disclosure seeks to provide utility pole auxiliary crossarm conversion (hereinafter "CAC") apparatuses. Turning now to FIGS. 1-7, which depict various views of the CAC, generally 100, in accordance with some embodiments. In general, the components of CAC 100 disclosed herein can be of shape, size, type, or kind; as well as have any orientation, location, quantity, components, and arrangement of components that would fulfill the objectives and intentions of the instant disclosure. The CAC 100 preferably has an overall quadrilateral structure and is configured to be utilized outdoors under various weather conditions, for example, sunny, cloudy, windy, rainy, and snowy. As such, the materials identified herein allow the CAC 100 to operate in the aforementioned weather conditions.

The CAC 100 preferably includes at least one first portion 105, second portion 120, and indentation 110. The first portion 105 preferably has an overall quadrilateral shape that includes a first side 125 and a second side 130 oriented opposite the first side 125. The first portion 105 is solid, which provides greater structural integrity compared to a hollow structure. In other embodiments, the first portion 105 has an internal honeycomb structure. In some embodiments, the first portion 105 is made of one or more metals, for example, aluminum, brass, powder coated steel, other metals, or a combination of two or more thereof. The first portion 105 is preferably made of aluminum, for example, 6061 aluminum. Not to be limited by theory, 6061 aluminum is highly resistant to corrosion, stress, and cracking (e.g., a tensile strength range of 20-42 KSI), which makes it an ideal material for outdoor use. For example, the first portion 105 can be formed by milling as well as other fabrication methods (e.g., casting)

Figure 6:
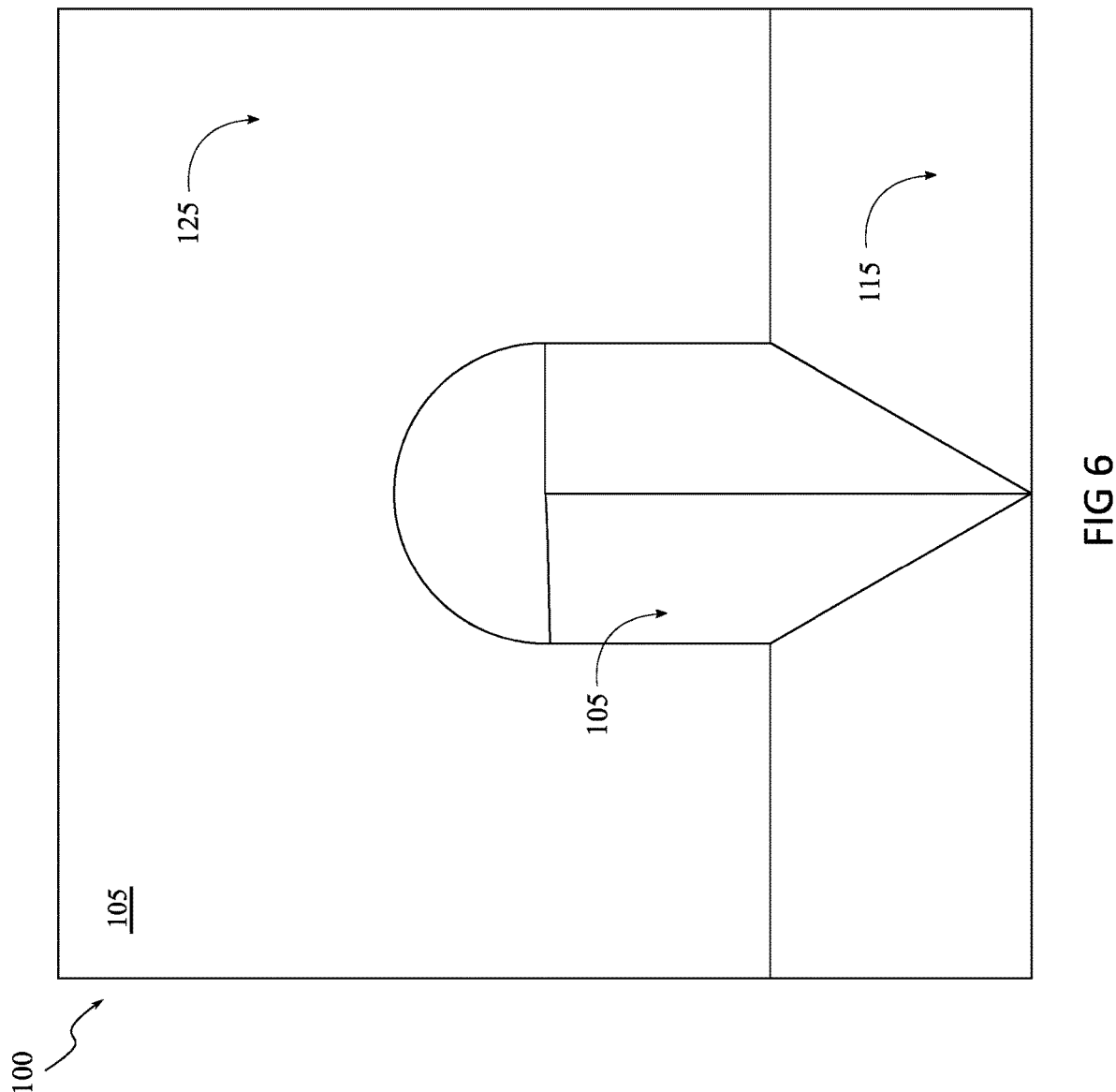
FIG. 6 depicts a top view of the present invention according to certain embodiments.
Figure 7:
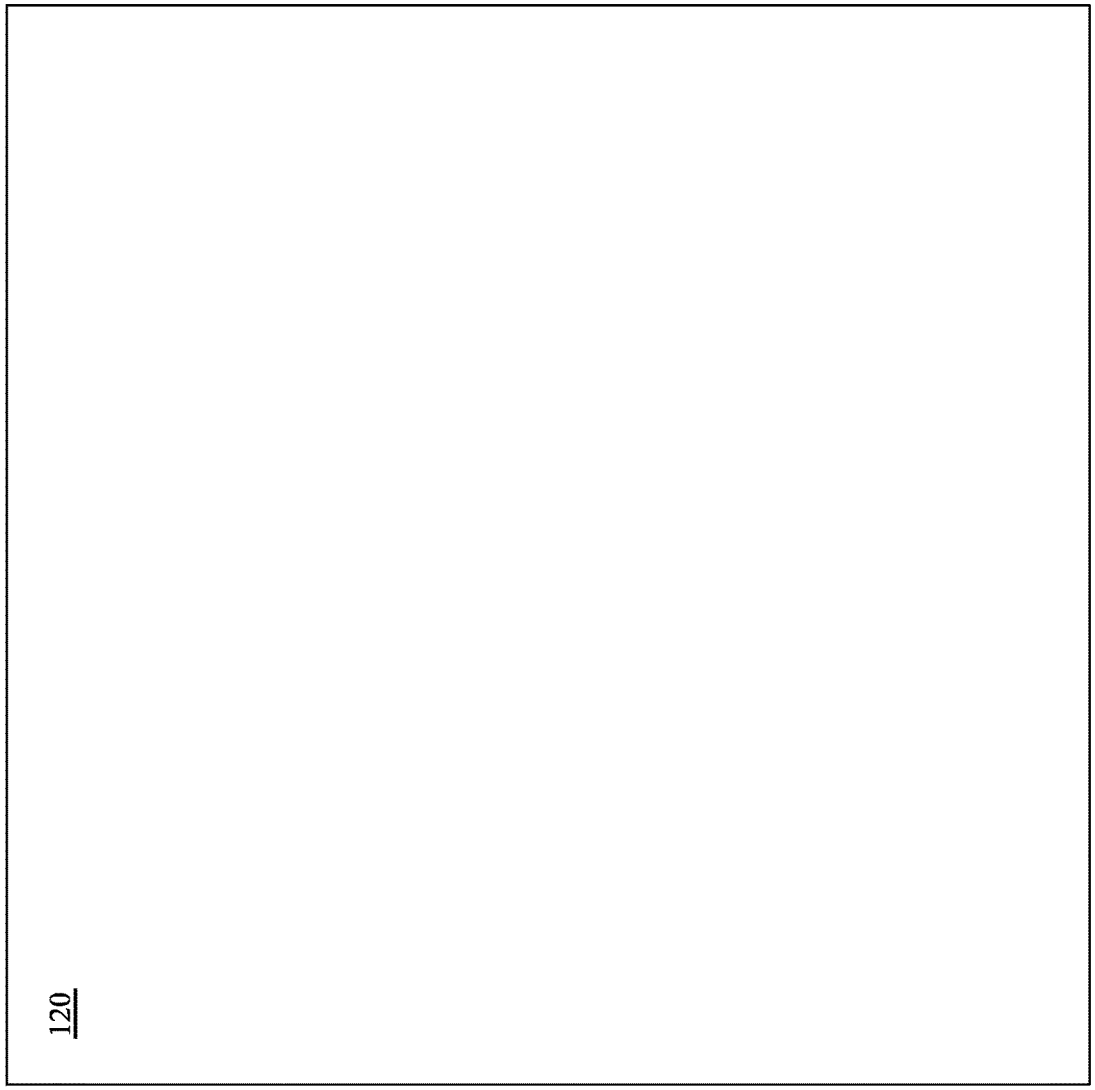
FIG. 7 depicts a bottom view of the present invention according to other embodiments.

The first portion 105 includes a chamfered edge 115, which, for example, allows the CAC 100 to be positioned closer to the base of crossarm clamps (e.g., crossarm clamp 830 of FIGS. 8-10) and thereby evenly distribute pressure received from the fastener (e.g., fastener 910) across the CAC 100. In other embodiments, the chamfered edge 115 is angled at thirty degrees (30°) or more from the first side 125. The indentation 110 is preferably positioned (e.g., formed) on the first side 125. For example, the indentation 110 can be milled in to the first side 125. As shown in FIG. 6, the indentation 110 is preferably bilaterally concaved and medially positioned on the first side 125. The indentation 110 preferably initiates centrally on the first side 125 and extends transversely across the first side 125 to the chamfered edge 115.

The indentation 110 includes an apex 300 angled at 45°-90°. The apex 300 is preferably and oriented towards the second side 130 and the second portion 120. As depicted in FIG. 6, the top view of the indentation 110 preferably has a shape similar to the combined image of a semi-circular portion positioned atop of a rectangular portion that is itself positioned atop of the base of a triangular portion with the apex thereof oriented opposite the semi-circular portion. Here, the diameter of the semi-circular portion is similar to the width of the rectangular portion and the base of the triangular portion. The indentation 110 is preferably configured to receive a tip (e.g., tip 915) of a fastener (e.g., the fastener 910) of a utility pole cross arm clamp (e.g., the clamp 830) coupled to a composite utility pole extension arm (e.g., the crossarm 810).

Threaded orifice 410 is a threaded opening that accepts threaded fasteners (i.e. fasteners having external screw threads). Although the threaded orifice 410 can be any size and depth that would allow for fulfillment of the objectives and intents of the present disclosure, the threaded orifice 410 is preferably configured to receive 10-32 size fasteners as defined under the Unified and American Screw Threads for Bolts, Nuts, and Machine Screws standards published by the American National Standards Institute. For example, the CAC 100 can include a lanyard (e.g., a cord or strap worn around the neck, shoulder, waist, or other object) affixed to the orifice 410 via a fastener.

In general, the second portion 120 is a component that allows the CAC 100 to rest on a crossarm (e.g., crossarm 810) without causing structural harm thereto. The second portion 120 includes an elastic polymer to, for example reduce the ability of the CAC 100 to cause structural harm to composite crossarms. The second portion 120 is preferably non-abrasive, which reduces the component's ability to cause the aforementioned structural harm. The second portion 120 is preferably replaceable when the material becomes worn. Applicable elastic polymers preferably include, but are not limited to, rubber. The second portion 120 is affixed to the second side 130 opposite the indentation 110. For example, the second portion 120 can be affixed on to the second 130 using a bonding agent. In other embodiments, the second portion 120 is formed on the first portion 120 (e.g., by dipping, spraying, coating, molding, casting, etc.). When completely assembled, the CAC 100 preferably has an overall quadrilateral structure. Although the CAC 100 can be any size, the CAC 100 preferably has a length and width of two (2) inches and an overall height of a half (0.5) an inch.

Figure 8:
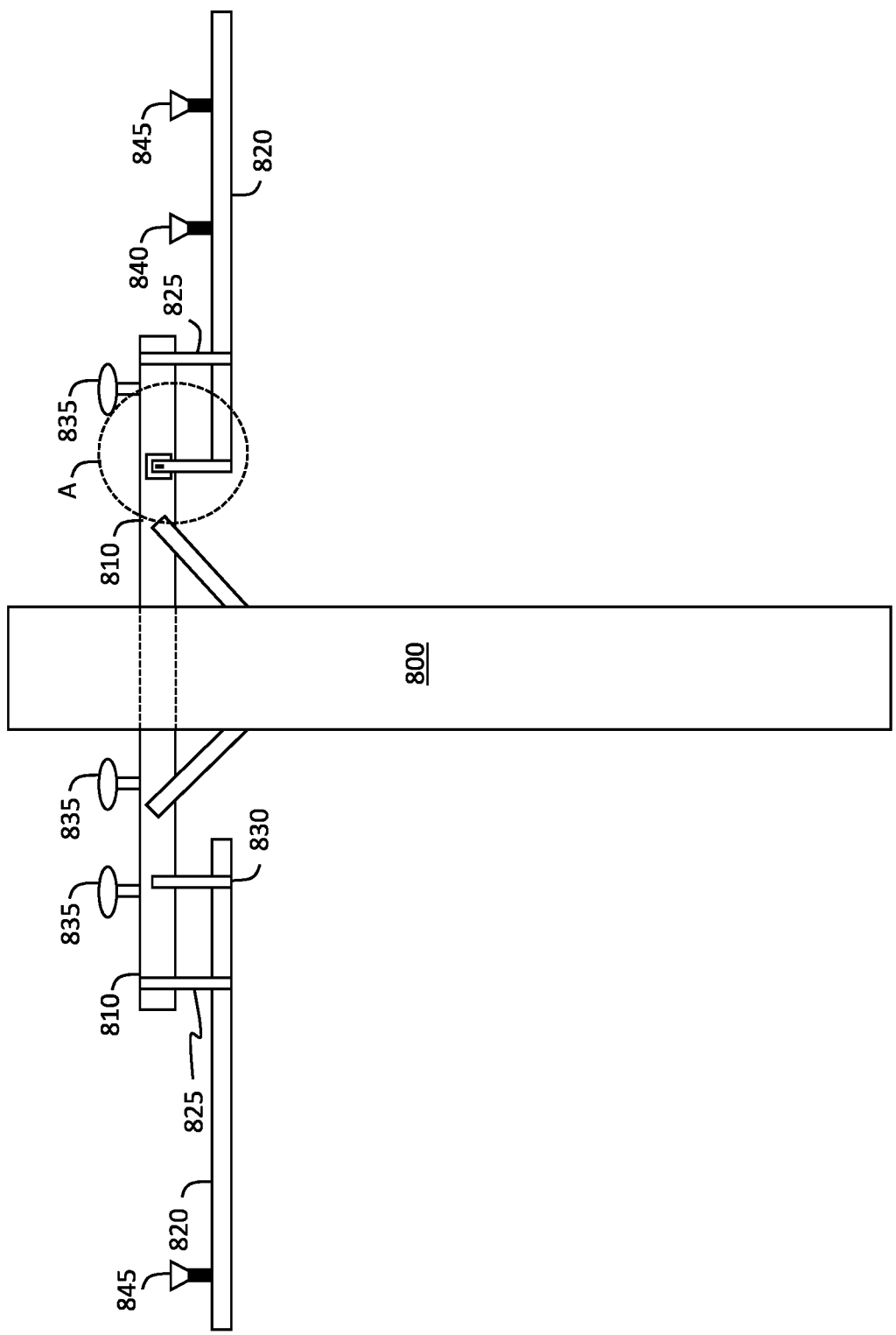
FIG. 8 illustrates an extension arm, generally 820, affixed to a utility pole, generally 800 and View A of the CAC 100 according to yet still other embodiments.
Figure 9:
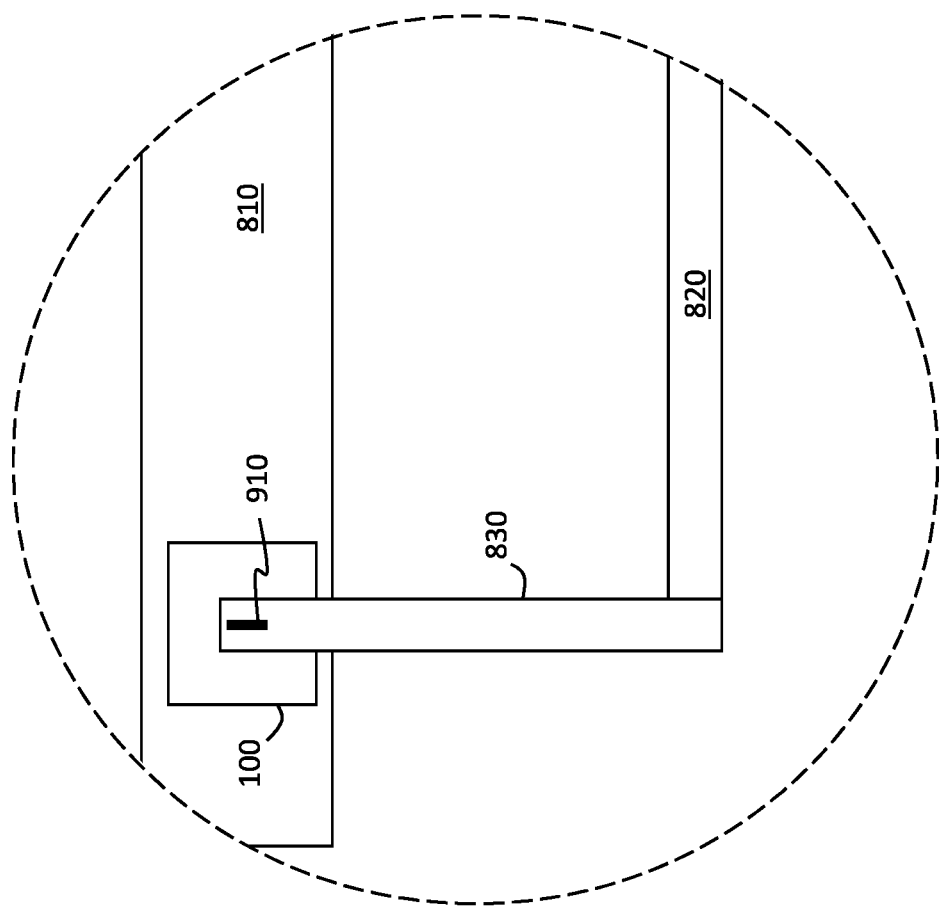
FIG. 9 illustrates View A of the CAC 100 according to some embodiments.
Figure 10:
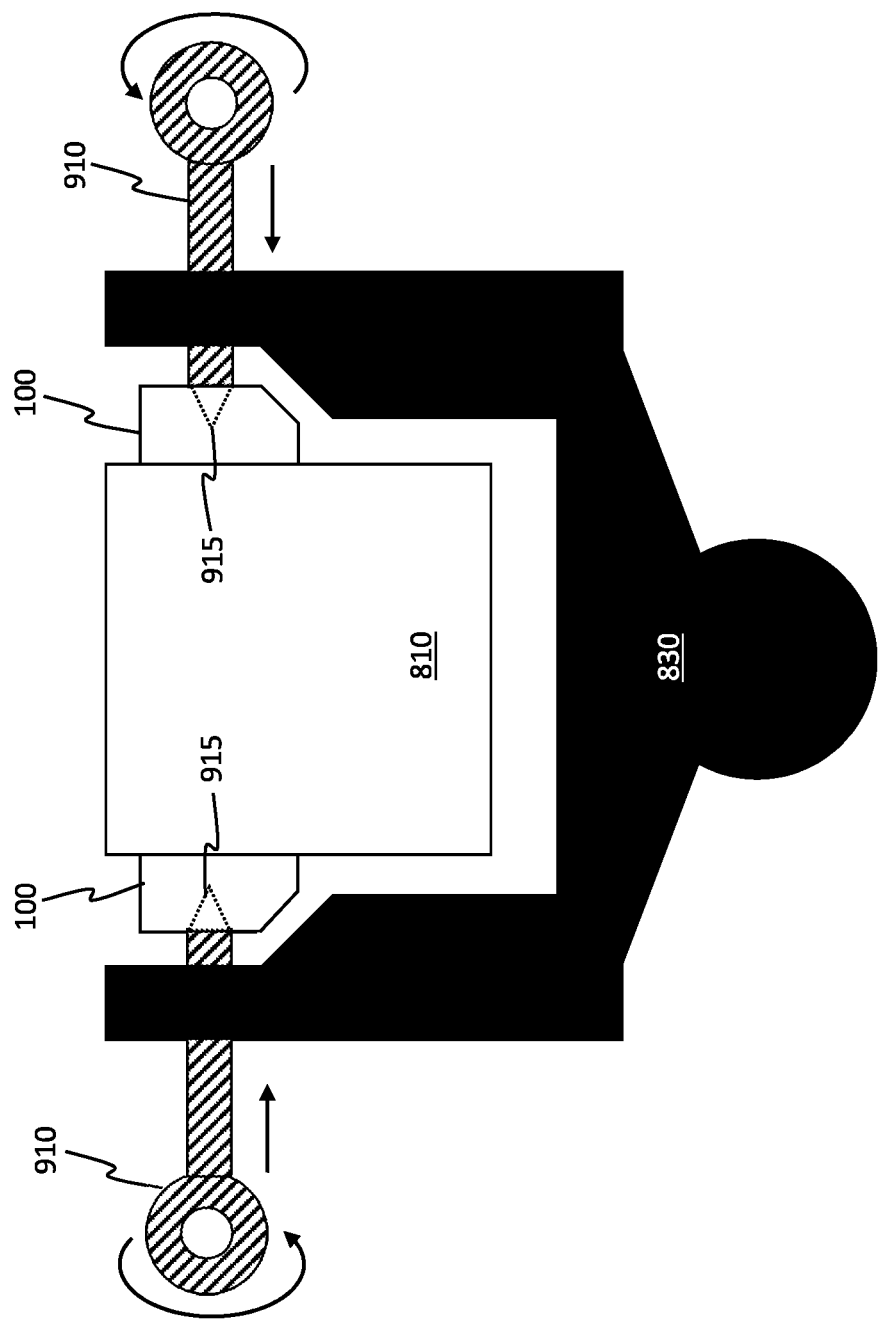
FIG. 10 illustrates a left view of View A according to certain embodiments.

Turning now to FIGS. 8-10. The CAC 100 is preferably used in conjunction with composite crossarms, such as composite crossarm 810. However, the CAC 100 can be used in conjunction with crossarms that are made of wood as well as other cellulose-based materials. Specifically, the CAC 100 is preferably used in live line maintenance, which is the maintenance of, for example, line conductors, line insulators, structural, parts etc. without de-energizing the line and with live line. FIG. 8 illustrates an extension arm, generally 820, affixed to a utility pole, generally 800 and View A of the CAC 100, according to some embodiments. The utility pole 800 can carry electrical and/or communications wiring. The utility pole 800 includes composite crossarm 810 symmetrically affixed thereto. The composite crossarm 810 holds wires up on the pole. Although not shown, the composite crossarm 810 can be asymmetrically affixed to the utility pole 800.

The composite crossarm 810 can include more or less insulators 835 affixed thereto. The insulators 835 supports the transmission wires (not shown). The insulators 835 prevent energized wires from coming in contact with each other or the utility pole 800. During live line maintenance, one or more extension arms 820 are affixed to the composite crossarms 810 via crossarm loop 825 and crossarm clamp 830. During live line maintenance, wires are moved off of the composite crossarm 810 to the wire holders 840 of the extension arms 820. Each of the extension arms 820 can include one or more wire holders 840. FIG. 9 illustrates View A of the CAC 100 and FIG. 10 illustrates a left view of View A, in accordance with certain embodiments.

Here, View A depicts the CAC 100 frictionally coupled to the composite crossbeam 810 via the fasteners 910 of the crossarm clamp 830. The composite crossarm 810 does not require any modifications (e.g., cutting and/or retrofitting) to accept the CAC 100. Even more, the CAC 100 can be utilized with any "hot" arm (e.g., "extension arm") currently known in the art. The crossarm clamp 830 is coupled to an end of the extension arm 820 proximate to the pole 800. Here, each of the CAC 100 is frictionally coupled to the composite crossarm 810 via one of the fasteners 910. For example, the fastener 910 is tapered threaded fastener that is positioned in a threaded orifice of the crossarm clamp 830. The fastener 910 preferably has a tip 915 that engages the indentation 110 when the fastener 910 is rotated within the threaded orifice. The CAC 100 frictionally couples to the composite crossarm 810 when the tip 915 engages the indentation 110. In other words, the indentation 110 is configured to receive the tip 915 of the fastener 910 included in the crossarm clamp 830. Here, the overall shape of the indentation 100 preferably complements the shape of the tip 915.

Although the disclosure has been explained in relation to its preferred embodiment, it is to be understood that many other possible modifications and variations can be made without departing from the spirit and scope of the disclosure.

What is claimed is:

1. A utility pole crossarm conversion apparatus, comprising:
   a first portion comprising:
      a first side; and
      a second side oriented opposite the first side;
   an indentation positioned on the first side;
   a second portion affixed to the second side;
   wherein
      the first portion comprises a chamfered edge;
      the indentation is bilaterally concaved;
      the indentation comprises an apex;
      the apex is angled at 45°-90°;
      the indentation is configured to receive a tip of a fastener of a utility pole crossarm clamp coupled to a composite utility pole extension arm;
      the indentation is medially positioned on the first side;
      the indentation initiates centrally on the first side and extends transversely across the first side to the chamfered edge;
      the first portion comprises a metal;
      the second portion comprises an elastic polymer;
      the apparatus comprises an overall quadrilateral structure; and
      the apparatus is configured to be frictionally coupled to a composite crossarm via the second portion.

2. The apparatus of claim 1, wherein the metal comprises aluminum.

3. The apparatus of claim 1, wherein the metal comprises brass.

4. The apparatus of claim 1, wherein the metal comprises powder coated steel.

5. The apparatus of claim 1, wherein the elastic polymer comprises a rubber.

6. The apparatus of claim 1, wherein the elastic polymer comprises an elastomer.

7. The apparatus of claim 1, wherein the second portion is non-abrasive.

8. The apparatus of claim 1, wherein the indentation comprises a shape complimentary to the tip.

9. A utility pole crossarm conversion block apparatus, comprising:
   a first portion comprising:
      a first side; and
      a second side oriented opposite the first side;
   an indentation positioned on a first side;
   a second portion affixed to the second side;
   wherein
      the first portion comprises a chamfered edge;
      the indentation is bilaterally concaved;
      the indentation comprises an apex;
      the apex is angled at 45°-90°;
      the indentation comprises is configured to receive a tip of a fastener of a utility pole cross arm clamp coupled to a composite utility pole extension arm;
      the indentation is medially positioned on the first side;
      the indentation initiates centrally on the first side and extends transversely across the first side to the chamfered edge;
      the indentation comprises a shape complementary to the tip;
      the first portion comprises a metal;
      the second portion comprises an elastic polymer;
      the apparatus comprises an overall quadrilateral structure; and
      the apparatus is configured to be frictionally coupled to a composite crossarm via the second portion.

10. The apparatus of claim 9, wherein the metal comprises aluminum.

11. The apparatus of claim 9, wherein the metal comprises brass.

12. The apparatus of claim 9, wherein the metal comprises powdered coated steel.

13. The apparatus of claim 9, wherein the elastic polymer comprises a rubber.

14. The apparatus of claim 9, wherein the elastic polymer comprises an elastomer.

15. The apparatus of claim 9, wherein the second portion is non-abrasive.

16. A utility pole crossarm conversion block apparatus, comprising:
   a first portion comprising:
      a first side; and
      a second side oriented opposite the first side;
   an indentation positioned on the first side;
   a second portion affixed to the second side;
   wherein
      the first portion comprises a chamfered edge;
      the indentation is bilaterally concaved;
      the indentation comprises an apex;
      the apex is angled at 45°-90°;
      the indentation comprises is configured to receive a tip of a fastener of a utility pole cross arm clamp coupled to a composite utility pole extension arm;
      the indentation is medially positioned on the first side;
      the indentation initiates centrally on the first side and extends transversely across the first side to the chamfered edge;
      the indentation comprises a first shape complementary to the tip;
      the first portion comprises aluminum;
      the second portion comprises an elastic polymer;
      the apparatus comprises an overall quadrilateral structure; and
      the apparatus is configured to be frictionally coupled to a composite crossarm via the second portion.

17. The apparatus of claim 16, wherein the elastic polymer comprises a rubber.

18. The apparatus of claim 17, wherein the second portion is non-abrasive.

19. The apparatus of claim 18, wherein the aluminum comprises 6061 aluminum allow.

* * * * *